United States Patent
Pansare et al.

(10) Patent No.: US 11,910,040 B2
(45) Date of Patent: Feb. 20, 2024

(54) METHODS AND SYSTEMS FOR PACKAGERS USED IN MEDIA STREAMING

(71) Applicant: Charter Communications Operating, LLC, St. Louis, MO (US)

(72) Inventors: Moin Pansare, Aurora, CO (US); Sachin Reddy Kota, Centennial, CO (US); David Agranoff, Golden, CO (US); Vipul Patel, Great Falls, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 127 days.

(21) Appl. No.: 17/203,287

(22) Filed: Mar. 16, 2021

(65) Prior Publication Data

US 2022/0303598 A1 Sep. 22, 2022

(51) Int. Cl.
| | |
|---|---|
| H04N 1/23 | (2006.01) |
| H04N 21/236 | (2011.01) |
| H04N 21/235 | (2011.01) |
| H04N 21/61 | (2011.01) |
| H04L 65/61 | (2022.01) |

(52) U.S. Cl.
CPC ....... *H04N 21/23614* (2013.01); *H04L 65/61* (2022.05); *H04N 21/2353* (2013.01); *H04N 21/6125* (2013.01)

(58) Field of Classification Search
CPC ......... H04N 21/23614; H04N 21/2353; H04N 21/6125; H04L 65/61
USPC ....................................................... 725/116
See application file for complete search history.

(56) References Cited

U.S. PATENT DOCUMENTS

| | | | |
|---|---|---|---|
| 9,332,296 B2 | 5/2016 | Ma et al. | |
| 10,693,642 B1* | 6/2020 | Saxton | H04L 9/065 |
| 2015/0113100 A1* | 4/2015 | Tweedale | H04L 41/0816 709/219 |
| 2015/0261600 A1* | 9/2015 | Iturralde | H04N 21/236 714/747 |
| 2015/0281752 A1* | 10/2015 | Van Veldhuisen | H04N 21/233 725/116 |
| 2016/0373821 A1* | 12/2016 | Nair | H04N 21/8456 |
| 2017/0214927 A1* | 7/2017 | Zenoni | H04N 19/42 |
| 2017/0289223 A1* | 10/2017 | Kipp | H04L 65/80 |
| 2019/0364319 A1* | 11/2019 | Milford | H04N 21/26258 |
| 2021/0377330 A1* | 12/2021 | Trayanov | H04N 21/2187 |

* cited by examiner

*Primary Examiner* — Alfonso Castro
(74) *Attorney, Agent, or Firm* — Young Basile Hanlon & MacFarlane, P.C.

(57) ABSTRACT

Methods and systems for using packager systems for streaming. The packager system including packagers configured to process packets, each packager having a packet listener, a sequence list generator, and a segment generator; and at least one cluster controller including a manifest generator. The at least one cluster controller configured to configure a packager from the packagers as an active packager by enabling a packet listener, a sequence list generator, and a segment generator, configure a remaining packager from the packagers as a backup packager by disabling a segment generator, receive segments, sequence list, and metadata based on processed packets from the active packager, generate, via the manifest generator, a manifest based on the segments, the sequence list, and the metadata, and send the segments and the manifest to a streaming system component.

14 Claims, 9 Drawing Sheets

FIG. 9

METHODS AND SYSTEMS FOR PACKAGERS USED IN MEDIA STREAMING

TECHNICAL FIELD

This disclosure relates to media or content (collectively "media") streaming. More specifically, this disclosure relates to packagers used in media streaming.

BACKGROUND

Streaming is a method and system of delivering media or content (collectively "media") from a source point, device, or system to an end-user over the Internet, for example. Streaming systems include endpoint packagers or packagers (collectively "packagers") which process input media and prepare output media streams for access by media players. The packagers can use a variety of streaming techniques to process and format the output media streams. For example, Dynamic Adaptive Streaming over Hypertext Transfer Protocol (HTTP) (DASH) and HTTP Live Streaming (HLS) are adaptive bitrate streaming techniques which enable high quality streaming of media over the Internet delivered from conventional HTTP web servers. Both of these techniques break the input media into a sequence of small segments for delivery over the HTTP web servers. Packagers are conventionally treated as black boxes with no means of controlling internal packager functionality. This can lead to increased computational costs, synchronization issues, latency, and other issues.

SUMMARY

Disclosed herein are methods and systems for packagers used in media streaming.

In embodiments, the packager system including packagers configured to process packets, each packager having a packet listener, a sequence list generator, and a segment generator; and at least one cluster controller including a manifest generator. The at least one cluster controller configured to configure a packager from the packagers as an active packager by enabling a packet listener, a sequence list generator, and a segment generator, configure a remaining packager from the packagers as a backup packager by disabling a segment generator, receive segments, sequence list, and metadata based on processed packets from the active packager, generate, via the manifest generator, a manifest based on the segments, the sequence list, and the metadata, and send the segments and the manifest to a streaming system component.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Figure 1:
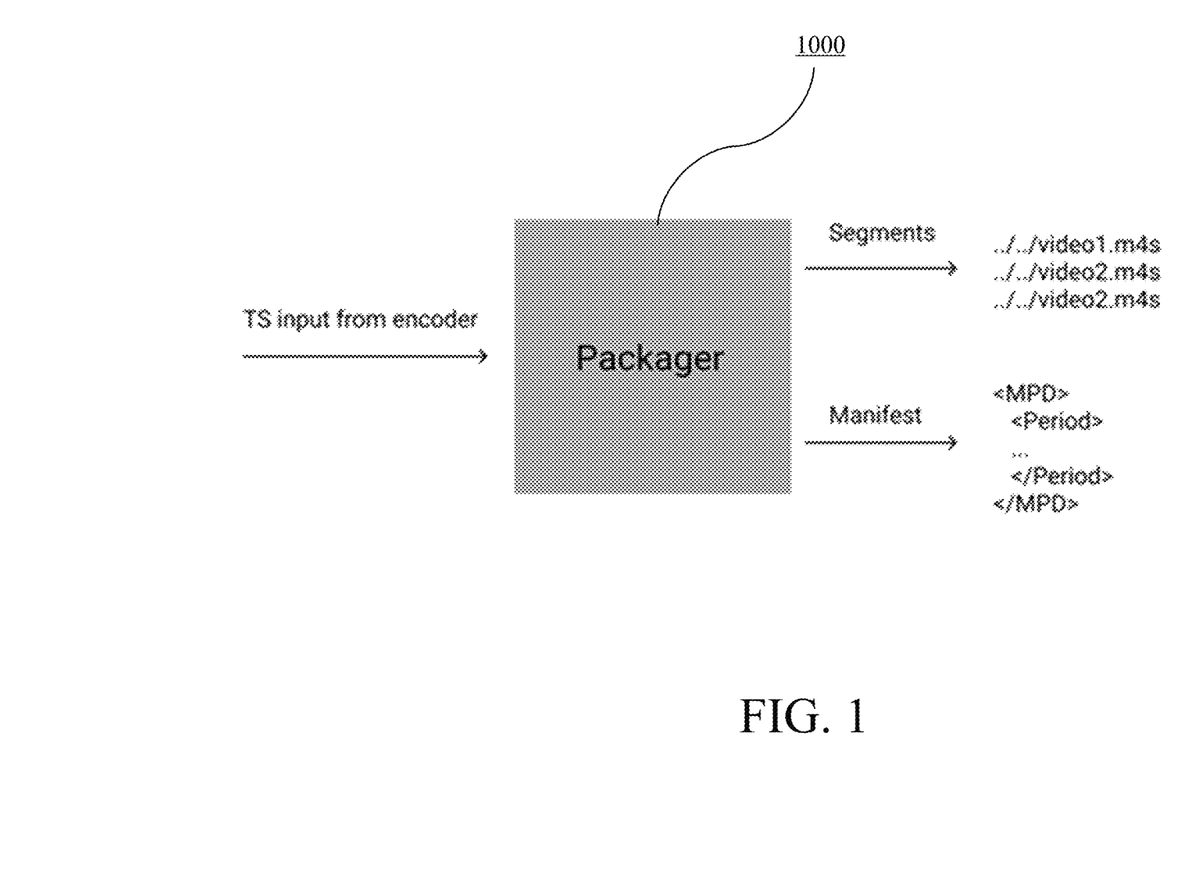
FIG. 1 is a diagram of a packager.

FIG. 1 is a diagram of a packager 1000 which can be used in a streaming system. The packager 1000 is conventionally treated as a black box which operates on an input 1100 from a source, such as a transport stream (TS) input stream delivered from an encoder in the streaming system. The packager 1000 processes the input and generates segments 1200 and a manifest 1300 which links the segments 1200 together in a playable stream. For example, the packager 1000 can splice the received content into chunks or segments and perform like processes which are known to one of skill in the art. Conventionally, the packager 1000 performs a number of operations which cannot be independently controlled. This can cause issues and decrease computational efficiencies when multiple packagers are deployed in a redundant or failover configuration in the streaming system.

Figure 2:
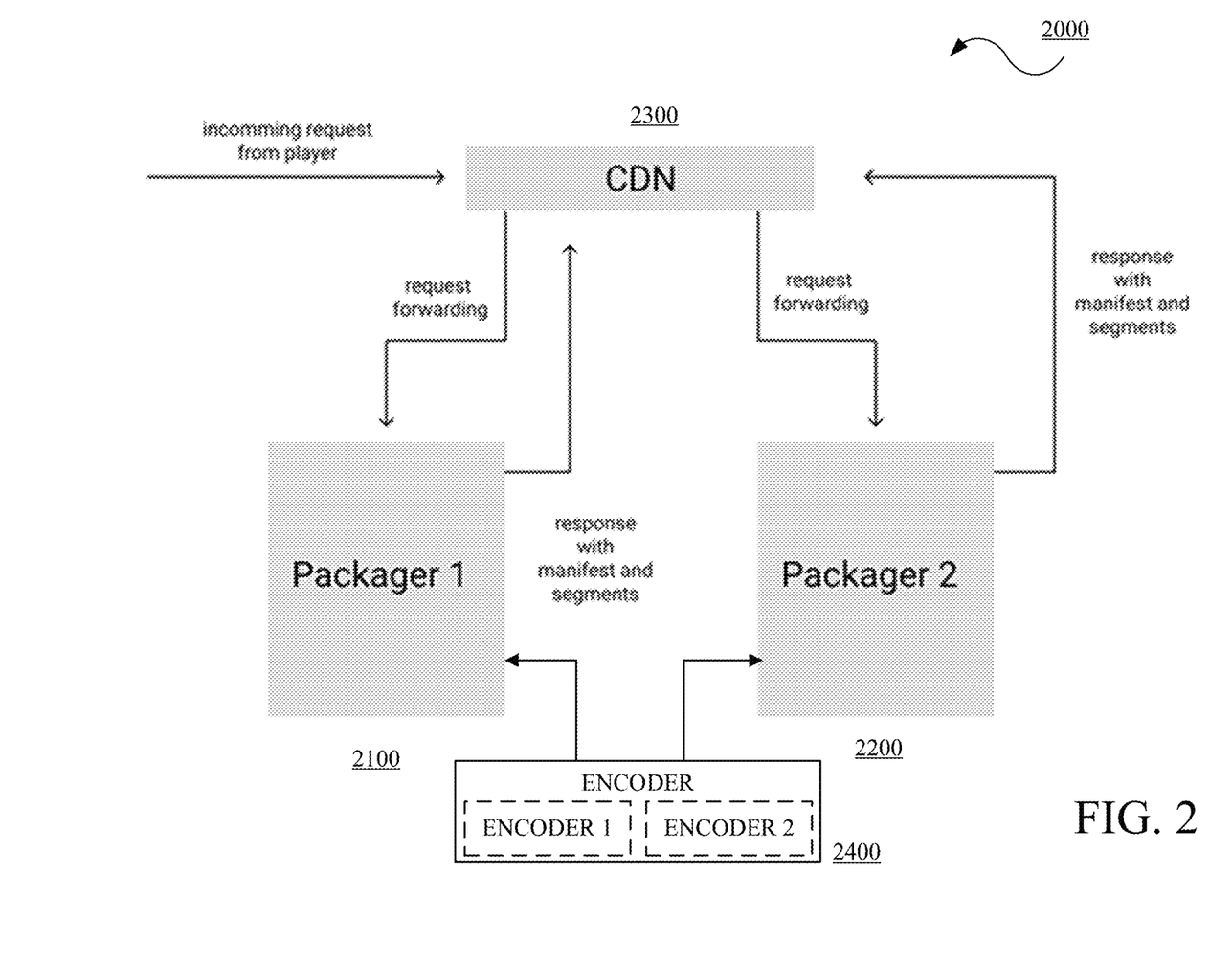
FIG. 2 is a diagram of an example streaming system.

FIG. 2 is a diagram of an example streaming system 2000. The streaming system 2000 includes a first packager 2100 and a second packager 2200 connected to a content delivery network (CDN) 2300 and an encoder 2400. One of the packagers can be the primary packager and the other can be the secondary packager. The first packager 2100 and the second packager 2200 are configured in a redundant or failover configuration. In the streaming system 2000, the CDN 2300 receives incoming requests from a player or other component in the streaming system, for example. The request, for example, can include a content identifier, file names, and like information for content that an end user, client, and/or subscriber (collectively "end-user") wishes to receive. The CDN 2300 directs the request to both the first packager 2100 and the second packager 2200. The first packager 2100 and the second packager 2200 tune and listen to a multicast from the encoder 2400 for the packets. In implementations, each of the first packager 2100 and the second packager 2200 can tune and listen to separate encoders such as encoder 1 and encoder 2, for example. Consequently, both the first packager 2100 and the second packager 2200 generate segments and manifests for the same input media stream.

This configuration along with lack of packager component control can lead to various issues. First, since the primary and the secondary packagers are both running, there is a waste of computational resources with respect to the secondary packager. Second, the manifests generated by each of the packagers can get out of synchronization as there is no communication mechanism to maintain such synchronization. The manifests can each contain a number of items including, but not limited to, adaptationID, segment_name, period_start, presentation_time_offset, and the like. Each of these can get out of synchronization. In an example, file names generated by the two packagers can be incrementally off so as to cause the player to stall while attempting to play the content. Out-of-synchronization manifests can require an explicit retuning from the players. Out-of-synchronization manifest situations can arise if the attributes of the manifest change, if the file naming/numbering is not consistent amongst the different packagers, and like issues. During a failover scenario, if the list of segments generated to maintain continuous playback, based on the information that has been received from the packager is not consistent, this can require retuning (restarting by dumping all earlier information and starting fresh) to prevent any issues arising within the player system. Third, in the instance that the primary packager is switched back on and reporting to the CDN 2300, the restarting results in a loss of segments in the manifest even though they have been generated in the secondary packager. Consequently, this requires explicit gap jumping in the player. Moreover, aggregation of multiple gap jumps causes the player stall extremely close to the streaming live edge. Fourth, when the packagers listen to separate encoders, although the content or multicast is the same, the encoders can be temporally offset. This, of course, causes synchronization and gapping issues.

Described herein are methods, devices, and systems for packagers used in streaming systems. In implementations, a packager is compartmentalized into multiple packager components, where each component can be individually switched on or off. In implementations, the multiple components include a User Datagram Protocol (UDP) listener, a packet parser, a sequence generator, a segment generator, and a manifest generator. In implementations where multiple packagers are deployed for redundancy purposes, a configuration or cluster server or controller (collectively "controller") can control which components of the multiple packagers can be active or on standby. This eliminates redundant processing across the multiple packagers and reduces computational processing costs.

In implementations, the manifest generator component can be eliminated from the packagers and moved to the controller. In implementations, storage of the segments can be moved from the packager or endpoint which includes the packager to the controller. In this sense, the controller can act as a file server in addition to being a configuration server. Consequently, the packagers are linked together via the controller, multiple or redundant manifests are not generated, and multiple or redundant segments are not generated.

In implementations, the streaming system can include a controller and multiple packagers where a primary packager can have all components running and secondary packagers can have all but the segment generator running. The primary packager can generate the segments and push the segments and metadata needed to generate the manifest to the controller. In the instance, when the primary packager fails, the controller can activate a segment generator in a secondary packager. As the other components, such as the UDP listener and the sequence generator are already running and listening to the same input stream as the primary packager, data loss is prevented. In the event that the primary packager is brought back online, both the primary and secondary packagers are kept running until the primary packager is in synchronization with the secondary packager. This prevents data loss and maintains continuity.

In implementations, the failover architecture decouples various components of an individual packager and maintains smooth transfer of the source input in case of network issues or other problems at a particular packager source. Decoupling of the individual packager components helps in reducing processing cost at multiple endpoints and helps overcome data loss in case of an endpoint recovery from a terminated state.

Figure 3:
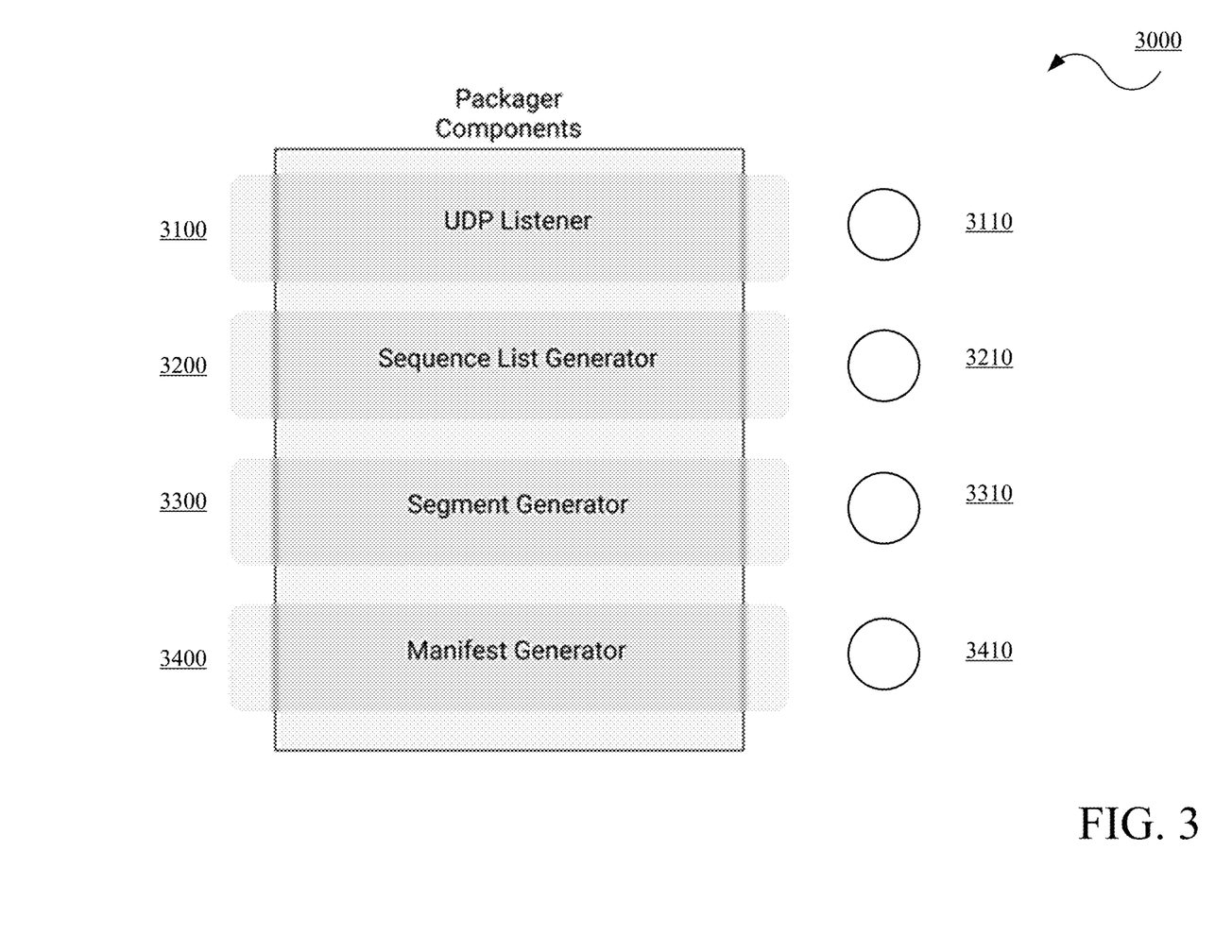
FIG. 3 is a block diagram of example packager components in accordance with embodiments of this disclosure.

FIG. 3 is a block diagram of example packager components 3000 in accordance with embodiments of this disclosure. A packager can be divided functionally into the packager components 3000 to provide individual and/or independent control of the associated functions therein. In implementations, the packager components 3000 include, but is not limited to, a UDP listener 3100 with a toggle switch 3110, a sequence list generator 3200 with a toggle switch 3210, a segment generator 3300 with a toggle switch 3310, and a manifest generator 3400 with a toggle switch 3410. In implementations, each toggle switch can be a flag, bit, and/or other mechanism for enabling or disabling a packager component. Each of the packager components 3000 can be turned on or off based on requirements, packager status, and/or the like. In implementations, the packager components 3000 can work independently of each other. In implementations, the packager components 3000 can work partially independently of each other. The packager components 3000 are illustrative and may include additional or different components, entities and the like which may be similarly or differently architected without departing from the scope of the specification and claims herein. For example, finer or different control can be provided by using additional or different packager components.

In implementations, the UDP listener 3100 can connect or listen to UDP multicasts to receive network packets for processing by an associated packager. In implementations, the UDP listener 3100 can be active in all packagers deployed in a redundant configuration. This ensures that each secondary or non-segment generating packager is in synchronization with respect to listening to the incoming packets and is in a ready or standby state. For example, this mitigates or overcomes issues related to variable delays when connecting to a multicast by the associated packager.

In implementations, the sequence list generator 3200 can parse through the incoming packets to read and decode packet information, including but not limited to, program association table (PAT) information, program map table (PMT) information, and packetized elementary streams (PESs) packets. The sequence list generator 3200 can chain or organize the incoming packets in sequence to prepare the incoming packets for segmentation. In implementations, the sequence list generator 3200 can be active in all packagers deployed in a redundant configuration. This ensures that each secondary or non-segment generating packager is in synchronization and is in a ready or standby state in the event of having to switch packagers. This maintains continuity. Synchronization and continuity issues can be caused by, for example, the delayed transmission of audio packets in comparison to video packets.

In implementations, the segment generator 3300 can process packet payloads in the sequence provided by the sequence list generator 3200. The segment generator 3300 can generate segments by reading encoder boundary points (EBP) and other information to generate segments files in appropriate formats such as .m4s files (for DASH) and .ts files (for HLS). In implementations, secondary packagers can have the segment generator 3300 in an off state. In an ideal situation where costs are not relevant, all packagers (packager1, packager2, . . . . , packager-n) in a system are online, there will be 'n' copies of the same segment being generated out of which only 1 will be utilized. Consequently, having the ability to toggle a segment generator on or off based on need and network state reduces storage, disk input/output (I/O), and computing utilization and/or resources.

In implementations, the manifest generator 3400 can read the generated segments from the segment generator 3300 and generate a manifest based on metadata related to or associated with the generated segments. Manifest synchronization issues can be mitigated by moving the manifest generator 3400 outside of the packager and to a platform common or central to all of the associated packagers. That is, the packagers can push and/or share the metadata with the platform, which in turn can generate the manifest regardless of which packager is the primary packager. In addition, this simplifies the packager with respect to storage, disk input/output (I/O), and computing utilization and/or resources.

Figure 4:
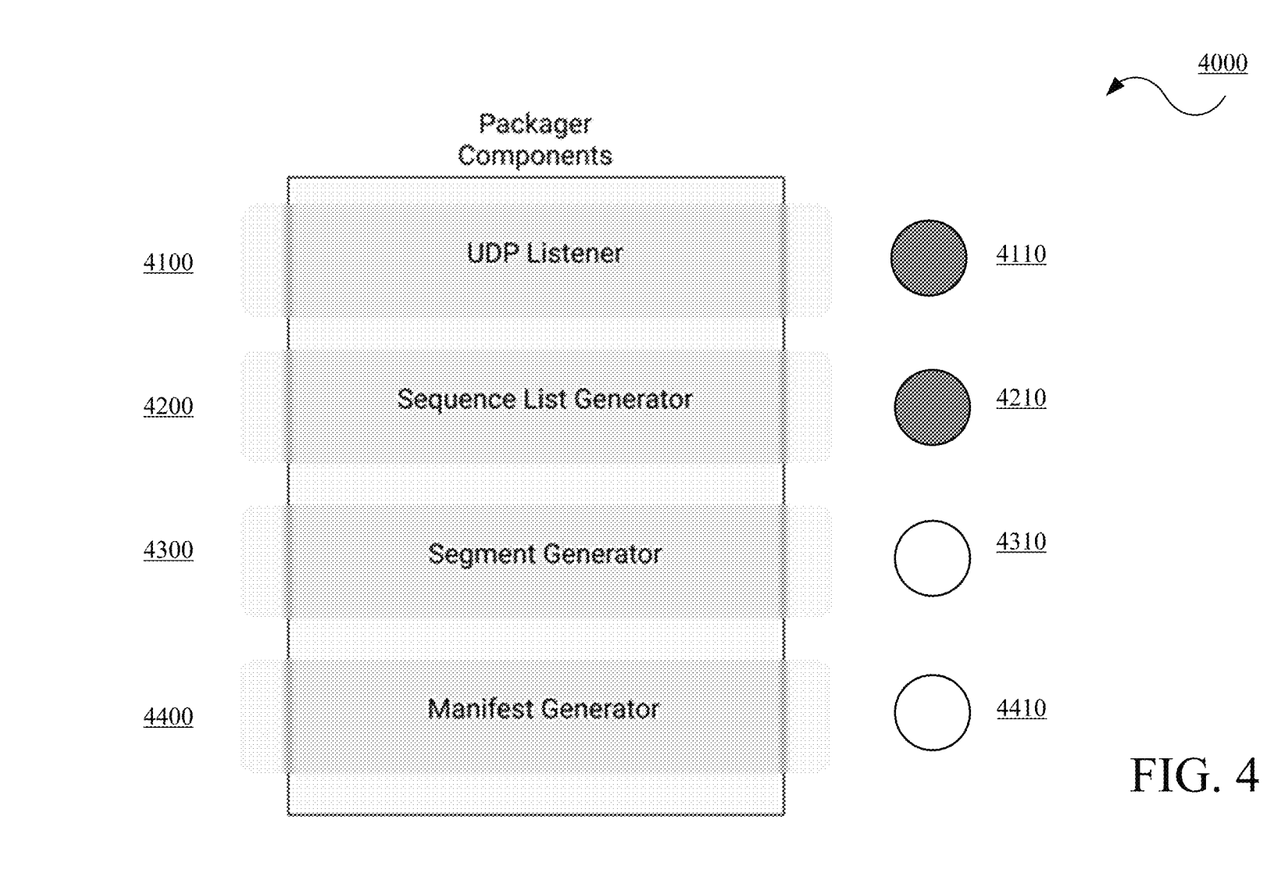
FIG. 4 is a block diagram of example packager components in a non-active or standby state in accordance with embodiments of this disclosure.

FIG. 4 is a block diagram of example packager components 4000 in a non-active or standby state in accordance with embodiments of this disclosure. In implementations, the packager components 4000 include, but is not limited to, a UDP listener 4100 with a toggle switch 4110, a sequence list generator 4200 with a toggle switch 4210, a segment generator 4300 with a toggle switch 4310, and a manifest generator 4400 with a toggle switch 4410. The packager components 4000 function and operate as described herein. In this instance, the UDP listener 4100 and the sequence list generator 4200 are enabled and the segment generator 4300 and the manifest generator 4400 (when present) are disabled.

Figure 5:
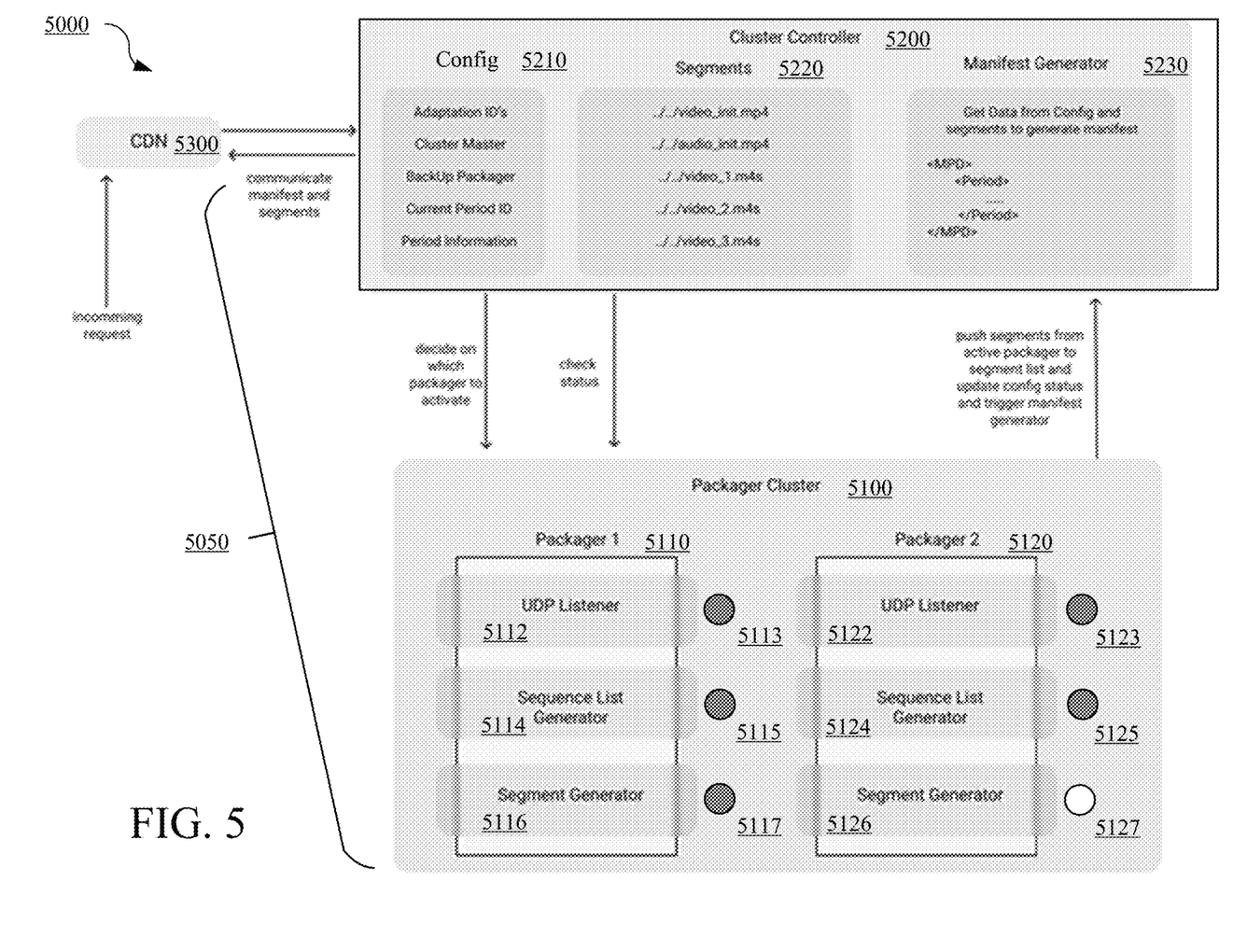
FIG. 5 is a diagram of an example streaming system in accordance with embodiments of this disclosure.
Figure 6:
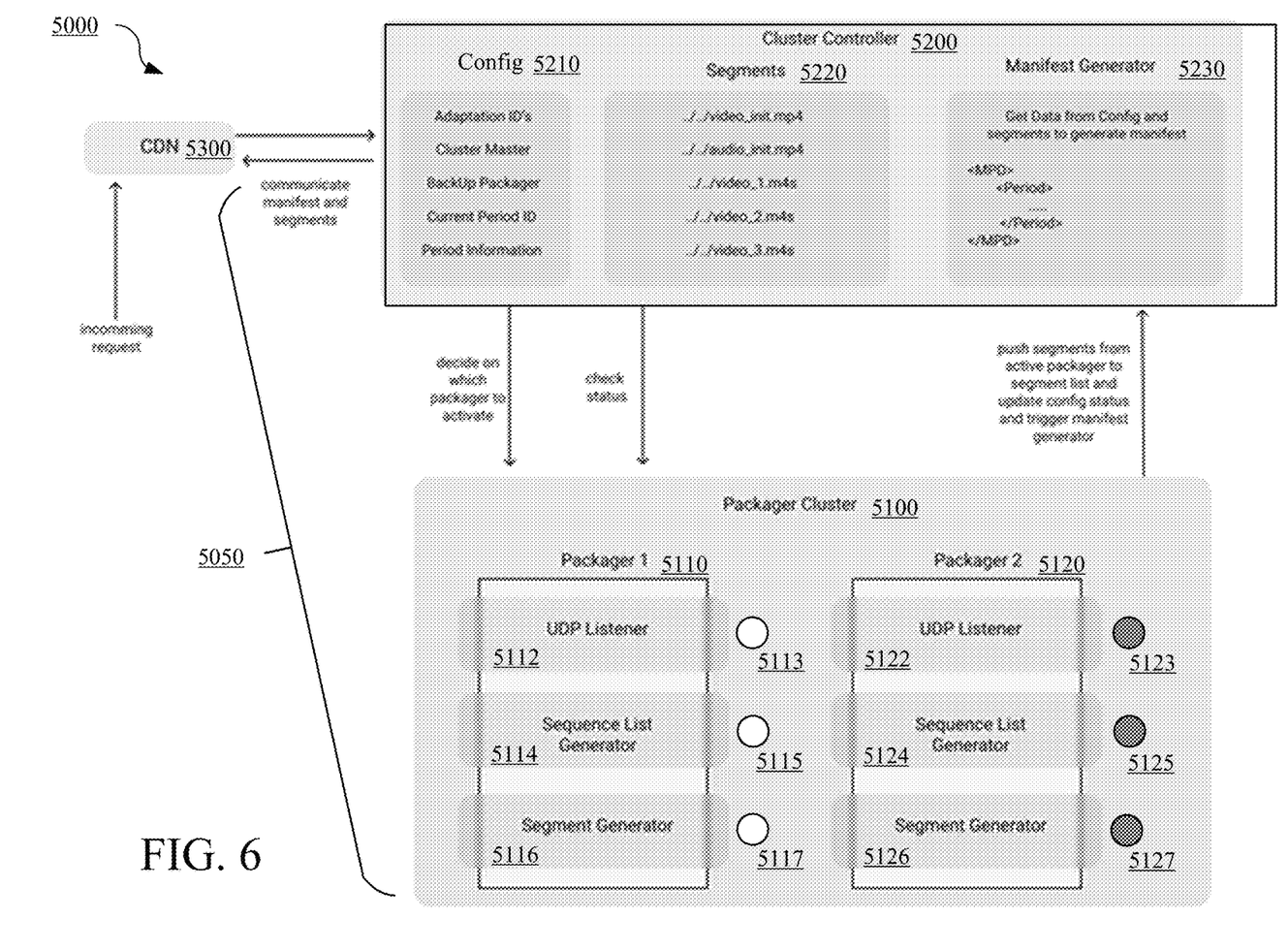
FIG. 6 is a diagram of the example streaming system of FIG. 5 with active secondary packager in accordance with embodiments of this disclosure.

FIG. 5 is a diagram of an example streaming system 5000 in accordance with embodiments of this disclosure and FIG. 6 is a diagram of the example streaming system 5000 of FIG. 5 with active secondary packager in accordance with embodiments of this disclosure.

In implementations, the streaming system 5000 can include, but is not limited to, a packager cluster 5100, a cluster controller 5200, and a CDN 5300. In implementations, the packager cluster 5100 and the cluster controller 5200 can be a packager system 5050. In implementations, the packager cluster 5100, the cluster controller 5200, and the CDN 5300 are connected to or in communication with each other via a combination of wired and/or wireless techniques, systems, and/or devices. The streaming system 5000 is illustrative and may include additional, fewer, or different components, entities and the like which may be similarly or differently architected without departing from the scope of the specification and claims herein.

In implementations, the packager cluster 5100 can include, but is not limited to, a packager 1 5110 and a packager 2 5120. The number of packagers in the packager cluster 5100 is variable. In implementations, the packager 1 5110 can include a UDP listener 5112 with a toggle switch 5113, a sequence list generator 5114 with a toggle switch 5115, and a segment generator 5116 with a toggle switch 5117. In implementations, the packager 2 5120 can include a UDP listener 5122 with a toggle switch 5123, a sequence list generator 5124 with a toggle switch 5125, and a segment generator 5126 with a toggle switch 5127. In implementations, the packager 1 5110 and a packager 2 5120 can push generated segments to a segment or file server 5220 and status changes to a configuration server and/or controller 5210. The pushing of the segments can trigger generation of the manifest by a manifest generator 5230.

In implementations, the cluster controller 5200 can include, but is not limited to, the configuration server and/or controller 5210, the segment or file server 5220, and the manifest generator 5230. In implementations, the configuration server and/or controller 5210 can control operation of the cluster controller 5200 and the packager cluster 5100. In implementations, the configuration server and/or controller 5210 can store or include configuration data, metadata for manifest generation, primary and secondary packager information, and the like. In implementations, the configuration server and/or controller 5210 can control and/or select with packager in the packager cluster 5100 is primary and which packagers are secondary. The configuration server and/or controller 5210 can turn on or off and/or enable or disable packager components in designated primary and secondary packagers. In implementations, the configuration server and/or controller 5210 can check status of the packagers in the packager cluster 5100. In implementations, the segment or file server 5220 can store the segments generated by the packager in the packager cluster. In implementations, the manifest generator 5230 can generate manifests based on configuration information, metadata, and segments obtained from the configuration server and/or controller 5210 and the segment or file server 5220.

In implementations, the CDN 5300 can receive incoming requests from a player or other component in the streaming system, for example. The request, for example, can include a content identifier, file names, and like information for content that an end user, client, and/or subscriber (collectively "end-user") wishes to receive. The CDN 5300 can receive the segments and manifest from the cluster controller 5200.

Operationally, with reference to FIGS. 5 and 6, the configuration server and/or controller 5210 can configure the packager cluster 5100 with the packager 1 5110 set as primary and the packager 2 5120 set as secondary or back-up. Accordingly, for the packager 1 5110, the UDP listener 5112 is switched on with toggle switch 5113, the sequence list generator 5114 is switched on with the toggle switch 5115, and the segment generator 5116 is switched on with the toggle switch 5117. For the packager 2 5120, the UDP listener 5122 is switched on with the toggle switch 5123, the sequence list generator 5124 is switched on with the toggle switch 5125, and the segment generator 5126 is switched off with the toggle switch 5127. Consequently, the packager 1 5110 and the packager 2 5120 are listening to the same source, encoder, or the like via the UDP listener 5112 and the UDP listener 5122, respectively, but the packager 2 5120 is configured not to generate segments.

The packager 1 5110 reads through the sequence list from the sequence list generator 5114 and the segment generator 5116 generates the individual segments. Instead of the storing each of the generated segments, the packager 1 5110 pushes each segment, immediately after segment generation, to the cluster controller 5200, the configuration server and/or controller 5210, and/or the segment or file server 5220. The segment or file server 5220 can store the segment and associated metadata, which can later be used by the manifest generator 5230 to generate the manifest. The packager 1 5110 can update the configuration server and/or controller 5210 with status and metadata information, which in turn can be shared with the secondary packagers such as the packager 2 5120.

In the event that the cluster controller 5200 and/or the configuration server and/or controller 5210 determines that the packager 1 5110 has an issue, the cluster controller 5200 and/or the configuration server and/or controller 5210 can trigger the packager 2 5120. In addition, the cluster controller 5200 and/or the configuration server and/or controller 5210 can share the last successfully generated segment information that it has so that packager 2 5120 can start segment generation from that point forward and flush all information prior to this point. In particular, the cluster controller 5200 and/or the configuration server and/or controller 5210 switches off the UDP listener 5112 with toggle switch 5113, the sequence list generator 5114 with the toggle switch 5115, and the segment generator 5116 with the toggle switch 5117 and switches on the segment generator 5126 with the toggle switch 5127 as shown in FIG. 6.

Now assume that the packager 1 5110 (which is the designated primary packager) is back online. Instead of switching immediately back to the packager 1 5110 from the packager 2 5120, both the packager 1 5110 and the packager 2 5120 are operated in tandem for a defined period of time. The waiting time allows the packager 2 5120 to fill the gap which can arise when switching back to the packager 1 5110. For example, when considering a DASH timeline, the packager 2 5120 has generated and pushed segments for program transport stream (PTS) $t_N$ when the packager 1 5110 comes back online. The packager 1 5110 can then start generating segments from time PTS $t_{N+3}$. In implementations, N+3 can be selected based on the delay associated with audio packet transmission. Consequently, the packager 1 5110 and the packager 2 5120 both operate to generate segments until both the packager 1 5110 and the packager 2 5120 push the segments for PTS $t_{N+1}$ and PTS $t_{N+2}$. As soon as both of these segments have been pushed, the cluster controller 5200 and/or the configuration server and/or controller 5210 switches off the segment generator 5126 with the toggle switch 5127, returning to the configuration shown in FIG. 5. This eliminates the gap jumps when switching and results in seamless playback.

From the perspective of the CDN 5300 or other external components in the streaming system 5000, the packager system 5050 presents no visible difference on the overall streaming architecture. Moreover, operational continuity and/or consistency is ensured due to sharing of information between the packagers, storing of the segments in the segment or file server 5220, and by moving the manifest generator 5230 to the cluster controller 5200.

For example, synchronization issues can be addressed by placement of the manifest generator 5230 in the cluster controller 5200. In some instances, multiple UDP listeners listening to sources can get out synchronization. This can be resolved using the manifest generator as it is common to the multiple UDP listeners. The manifest generator can compare the PTS value of the last available segment and the new pushed segment. In an example, assume that a first packager has gone offline and the new pushed segment was received from the second packager. If the comparison shows that the expected PTS (based on the new pushed segment) does not match the current PTS (based on the last available segment), then the manifest generator can introduce a new period at that place in the sequence, starting at the newly pushed segment. Here the term period refers to a collection of segments of same or similar content. For example, content and advertisements would be in different periods. The use of the period separates the stream for different playback timelines. This effectively prevents gaps in playback and prevents the current active player from retuning.

Figure 7:
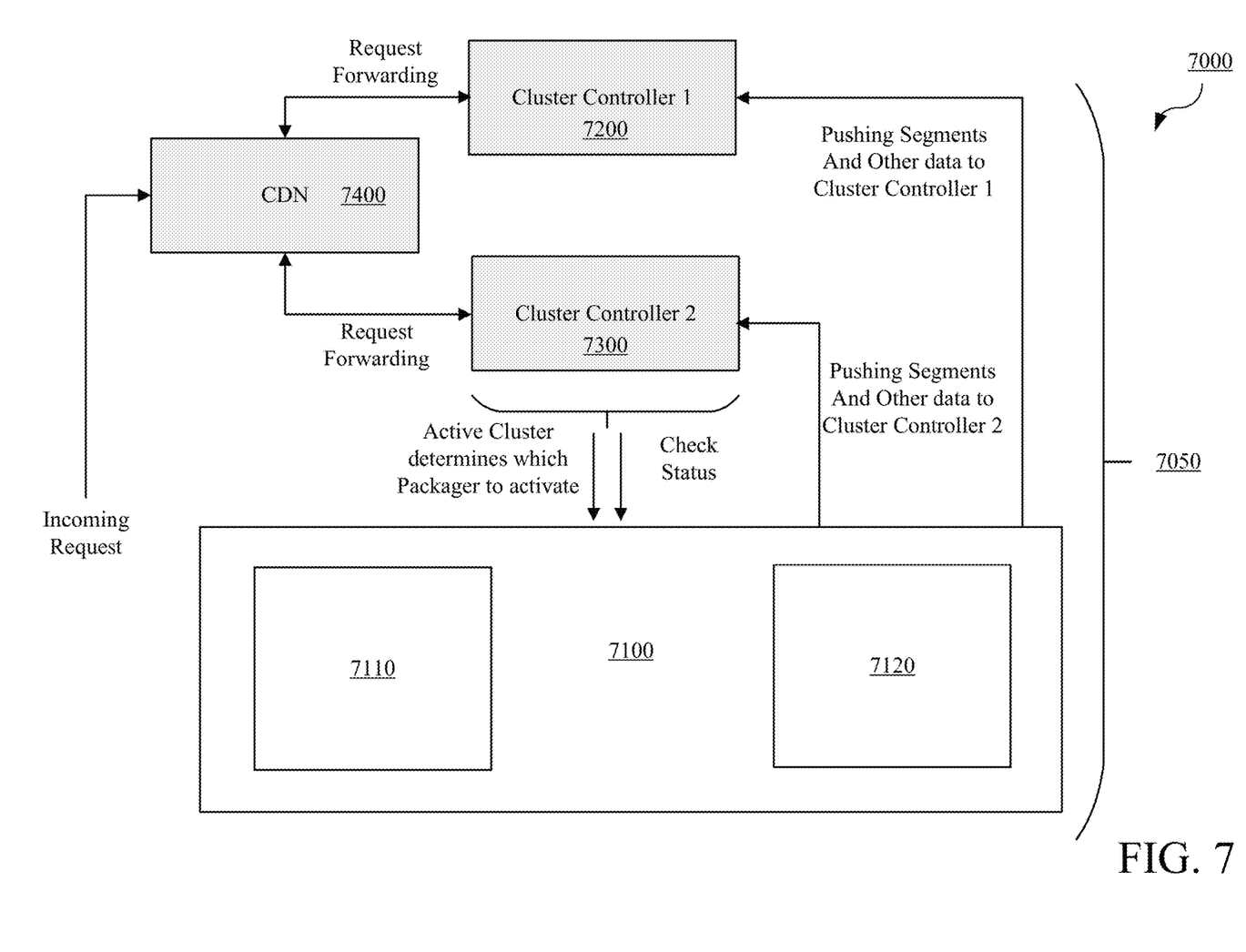
FIG. 7 is a diagram of an example streaming system with redundant cluster servers in accordance with embodiments of this disclosure.

FIG. 7 is a diagram of an example streaming system 7000 with redundant cluster servers in accordance with embodiments of this disclosure. In implementations, the streaming system 7000 can include, but is not limited to, a packager cluster 7100, a cluster controller 1 7200, a cluster controller 2 7300, and a CDN 5300. In implementations, the packager cluster 7100, the cluster controller 1 7200, and the cluster controller 2 7300 can be a packager system 7050. In implementations, the number of cluster controllers and the number of packagers in the packager cluster 7100 are variable. In implementations, the packager cluster 7100, the cluster controller 1 7200, the cluster controller 2 7300, and the CDN 7400 are connected to or in communication with each other via a combination of wired and/or wireless techniques, systems, and/or devices. The streaming system 7000 is illustrative and may include additional, fewer, or different components, entities and the like which may be similarly or differently architected without departing from the scope of the specification and claims herein.

In implementations, the packager cluster 7100 can function and operate as the packager cluster 5100, the cluster controller 1 7200 can function and operate as the cluster controller 5200, and the cluster controller 2 7300 can function and operate as the cluster controller 5200, all in addition to the functionality as described herein. In implementations, the packager cluster 7100 includes packager 7110 and packager 7120.

The dual cluster controller configuration can prevent or mitigate a single point of failure with respect to the cluster controller functionality. In a sense, it is similar to the multiple packager configuration of the packager cluster 5100. In the streaming system 7000, both the cluster controller 1 7200 and the cluster controller 2 7300 can be connected to packager cluster 7100 to receive the pushed segments and information from the packager 7110 and the packager 7120, as appropriate and applicable. This can keep both of the controller 1 7200 and the cluster controller 2 7300 in synchronization. In implementations, the CDN 7400 can check cluster controller operability by using heartbeat pings and direct a request accordingly. In implementations, one of the cluster controller 1 7200 and the cluster controller 2 7300 can be designated as a primary. In implementations, the CDN 7400 can designate a primary cluster controller. Once designated or selected, the cluster controller (now the "active") cluster controller operates as described herein by selecting a packager in the packager cluster 7100.

Figure 8:
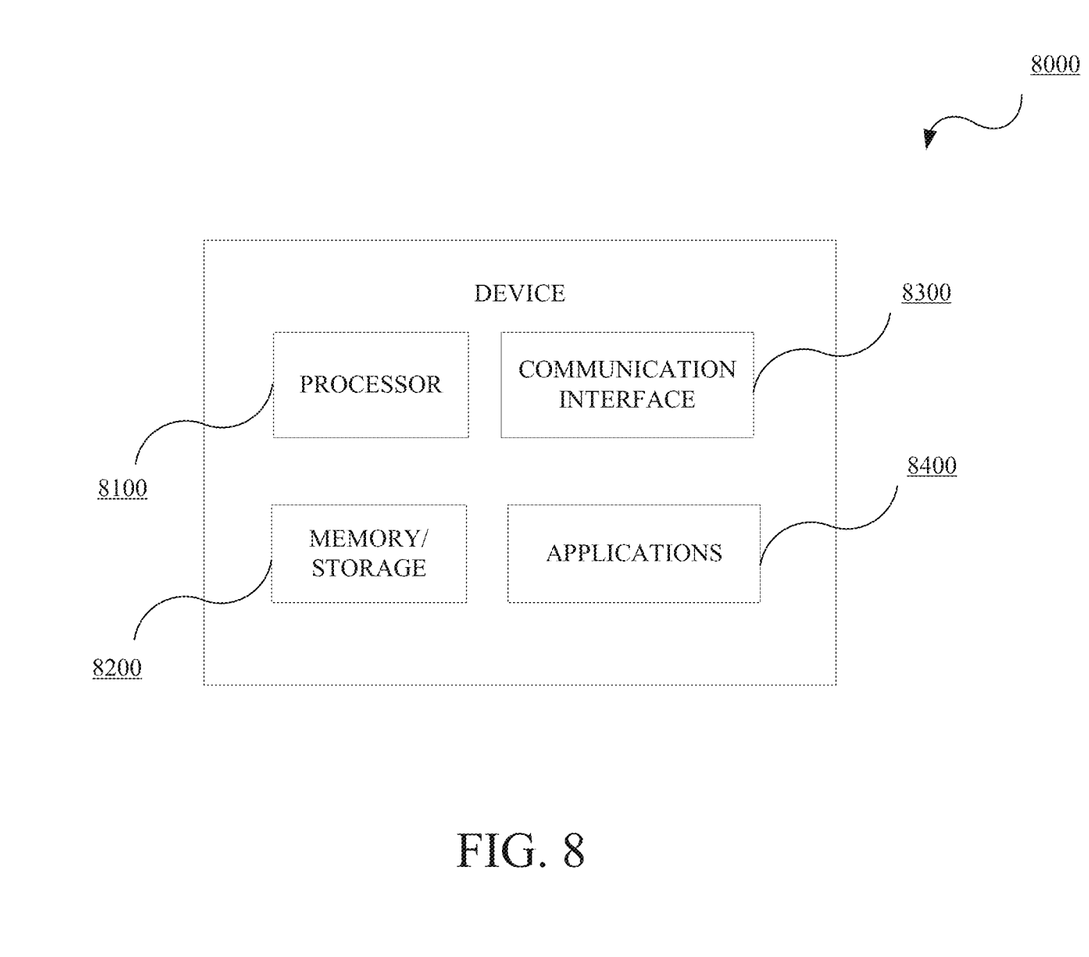
FIG. 8 is a block diagram of an example device in accordance with some embodiments of this disclosure.

FIG. 8 is a block diagram of an example device 8000 in accordance with some embodiments of this disclosure. The device 8000 may include, but is not limited to, a processor 8100, a memory/storage 8200, a communication interface 8300, and applications 8400. The device 8000 may include or implement, for example, the packager components 3000, the packager components 4000, the streaming system 5000, the streaming system 7000, and the components therein. In implementations, the memory/storage 8200 may store the content, segments, manifest, metadata, sequence list, toggle switch status, packager status, cluster controller status, and the like information. In implementations, the applications 8400 can include, for example, a content streaming application, packager, packager components, and the like. The techniques or methods described herein may be stored in the memory/storage 8200 and executed by the processor 8100 in cooperation with the memory/storage 8200, the communications interface 8300, and applications 8400, as appropriate. The device 8000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 9:
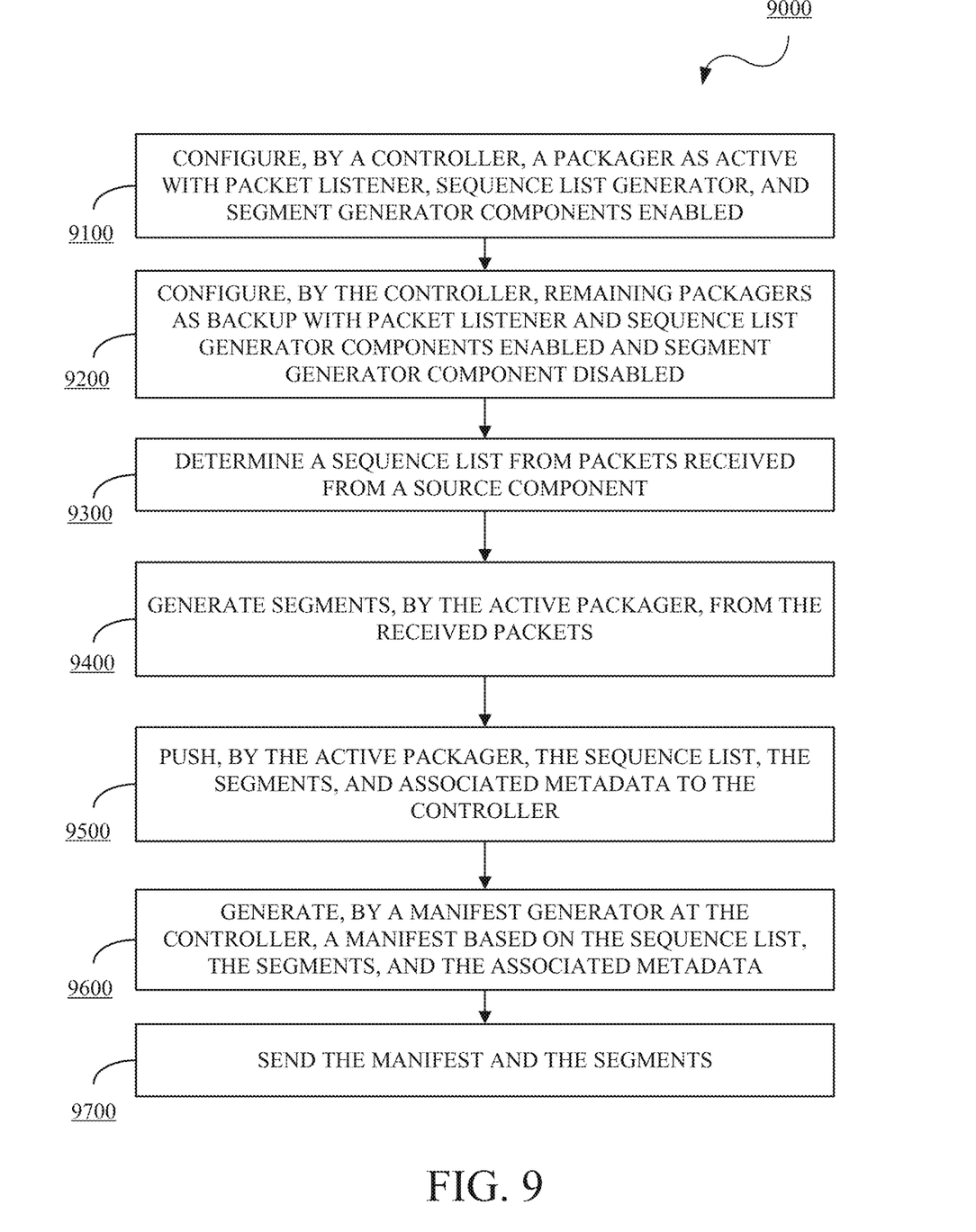
FIG. 9 is a flowchart of an example method for streaming with packager systems in accordance with embodiments of this disclosure.

FIG. 9 is a flowchart of an example method for streaming with packager systems in accordance with embodiments of this disclosure. The method 9000 includes: configuring 9100, by a controller, a packager as active with packet listener, sequence list generator, and segment generator components enabled; configuring 9200, by the controller, remaining packagers as backup with packet listener and sequence list generator components enabled and segment generator component disabled; determining 9300 a sequence list from packets received from a source component; generating 9400 segments, by the active packager, from the received packets; pushing 9500, by the active packager, the sequence list, the segments, and associated metadata to the controller; generating 9600, by a manifest generator at the controller, a manifest based on the sequence list, the segments, and the associated metadata; and sending 9700 the manifest and the segments. For example, the method 9000 may be implemented, as applicable and appropriate, by the packager components 3000, the packager components 4000, the streaming system 5000, the streaming system 7000, and the components therein, the device 8000, the processor 8100, the memory/storage 8200, the communication interface 8300, and the applications 8400, for example.

The method 9000 includes configuring 9100, by a controller, a packager as an active with packet listener, sequence list generator, and segment generator components enabled, and configuring 9200, by the controller, remaining packagers as backup packagers with packet listener and sequence list generator components enabled and segment generator component disabled. A streaming system can include a packager system which includes a controller and multiple packagers configured in a failover or redundant configuration. Each packager can include packager components which can be enabled or disabled by the controller. The controller, based on packager and network status, selects an active packager for an incoming request to process a packet stream from a source component, encoder, and/or the like. The remaining packagers are backup packagers or in standby. In an initial configuration, only the active packager has a segment generator component enabled. In implementations, the controller can be multiple controllers configured in a failover or redundant configuration. In this instance, a streaming system component, CDN, or the like can send the incoming request to both controllers and selects one controller as the active controller. The active cluster can select the active packager as described herein.

The method 9000 includes determining 9300 a sequence list from packets received from a source component. Each of the active and backup packagers can listen to packets and generate a sequence list based on the packets.

The method 9000 includes generating 9400 segments, by the active packager, from the received packets. The active packager can generate segments based on the packets and the sequence list.

The method 9000 includes pushing 9500, by the active packager, the sequence list, the segments, and associated metadata to the controller. The active packager can push the sequence list, the segments, and associated metadata to the controller. In implementations, the active packager can push to the active controller as described herein. The controller can store the segments, the sequence list, and the metadata. In implementations, if the controller or active controller detects active packager failure, the current active packager is disabled, a backup packager is activated and is now deemed the active packager. In the event, the previous active packager is back online, both the previous active packager and the current active packager can be operated for a defined period until the previous active packager catches up to the current active packager with respect to pushed segments. At this point, the current active packager is put in backup mode as described herein.

The method 9000 includes generating 9600, by a manifest generator at the controller, a manifest based on the sequence list, the segments, and the associated metadata. The controller can include a manifest generator which can generate a manifest based on the stored sequence list, segments, and associated metadata. In implementations, if the manifest generator determines that there is a synchronization issue due to switching packagers, the manifest generator can insert or start a new or additional period at that instance to prevent gaps in playback.

The method 9000 includes sending 9700 the manifest and the segments.

In general, a packager system including packagers configured to process packets, each packager having a packet listener, a sequence list generator, and a segment generator, and at least one cluster controller including a manifest generator. The at least one cluster controller configured to configure a packager from the packagers as an active packager by enabling a packet listener, a sequence list generator, and a segment generator, configure a remaining packager from the packagers as a backup packager by disabling a segment generator, receive segments, sequence list, and metadata based on processed packets from the active packager, generate, via the manifest generator, a manifest based on the segments, the sequence list, and the metadata, and send the segments and the manifest to a streaming system component.

In implementations, the active packager configured to listen for the packets, generate the sequence list from the packets, generate segments from the packets, and push the segments, the sequence list, and the metadata to the at least one cluster controller. In implementations, the at least one cluster controller further configured to configure the remaining packager as the backup packager by enabling a packet listener and a sequence list generator. In implementations, the at least one cluster controller further configured to receive status information from the active packager and the remaining packager. In implementations, the at least one cluster controller further configured to determine packager configuration based on the status and a network status. In implementations, the at least one cluster controller further configured to switch from the active packager to the backup packager when a failure status is received from the active packager, configure the backup packager as the active packager by enabling a segment generator, and configure a failed active packager as offline by disabling a packet listener, a sequence list generator, and a segment generator. In implementations, the at least one cluster controller further configured to configure the failed active packager as a tandem operating active packager by enabling a packet listener, a sequence list generator, and a segment generator, maintain operation of the active packager and the tandem active packager for a defined period, configure the active packager as a backup packager by disabling a segment generator upon expiration of the defined period, and configure the tandem operating active packager as the active packager. In implementations, the manifest generator further configured to insert a period when a gap is determined between a last available segment and a newly pushed segment, the period starting at the newly pushed segment. In implementations, the at least one cluster controller including a first cluster controller and a second cluster controller in a failover configuration, another streaming system component configured to designate an active cluster controller from the first cluster controller and a second cluster controller, the active cluster configured to configure the packagers. In implementations, the active packager configured to push the segments, the sequence list, and the metadata to the first cluster controller and the second cluster controller.

In general, a packager device includes a primary packager, and at least one secondary packager, each of the primary packager and the at least one secondary packager configured to process packets for streaming, where each of the primary packager and the at least one secondary packager includes a listener, a sequence provider, and a segmentor which is switchable between an on state and an off state by a controller, where the primary packager is configured to have a respective listener, a sequence provider, and a segmentor in the on state, and where the at least one secondary packager is configured to have a segmentor in the off state.

In implementations, the primary packager configured to listen for the packets, provide a sequence list based on the packets, generate segments from the packets, and push the segments, the sequence list, and metadata to the controller. In implementations, the primary packager and the at least one secondary packager further configured to provide operational status to the controller. In implementations, the at least one secondary packager further configured to have a listener and a sequence provider in the on state.

In general, a method for streaming includes configuring, by a controller, a packager as active with a packet listener, a sequence list generator, and a segment generator enabled, configuring, by the controller, at least another packager as standby with each segment generator disabled, receiving, from an active packager at the controller, a push message with a sequence list, segments, and associated metadata based on packets received by the packager as active, generating, by a manifest generator at the controller, a manifest based on the sequence list, the segments, and the associated metadata, and sending, by the controller, the manifest and the segments.

In implementations, the method further comprising configuring, by the controller, each of the at least another packager as standby with each packet listener and each sequence list generator enabled. In implementations, the method further comprising receiving status information from the active packager and each of the at least one packager in standby, and determining, by the controller, active and standby packager configuration based on the status and network status. In implementations, when the packager as active fails, the method further includes re-configuring the packager as active to offline, and re-configuring another packager in standby to active. In implementations, the method further includes re-configuring an offline packager back to active, running the packager as active and the another packager as active for a defined number of segments, and re-configuring the another packager to standby when the defined number of segments is exceeded. In implementations, the method further includes starting, by the manifest generator, a period at a newly pushed segment when a gap is determined between a last available segment and the newly pushed segment.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A packager system comprising:
   packagers configured to process packets, each packager having:
      a packet listener configured to listen for the packets,
      a sequence list generator configured to generate a sequence list from the packets, and
      a segment generator configured to generate segments from the packets,
      wherein each packager is configured to push the segments, the sequence list, and metadata to at least one cluster controller, wherein the segments are immediately pushed to the at least one cluster controller after the segments are generated; and
   the at least one cluster controller remotely located from the packager, wherein the at least one cluster controller is in communication with the packagers, and includes a manifest generator located outside and remote from the packagers, the at least one cluster controller configured to:
      configure a packager from the packagers as an active packager by enabling a packet listener, a sequence list generator, and a segment generator;
      receive segments, sequence list, and metadata based on processed packets from the active packager;
      generate, via the manifest generator, a manifest based on the segments, the sequence list, and the metadata received from the active packager;
      send the segments and the manifest received from the active packager to a streaming system component;
      configure another packager from the packagers as a backup packager by disabling a respective segment generator and enabling a respective packet listener and a respective sequence list generator to listen for the packets and generate a sequence list before disabled respective segment generator becomes enabled; and
      responsive to determining that the packet listener of the active packager and the respective packet listener of the backup packager are not in synchronization, use the manifest generator of the at least one cluster controller to compare respective program transport stream (PTS) timestamps of a last available segment and a newly pushed segment, and insert a period to a newly pushed segment when there is a gap between the respective PTS timestamps.

2. The system of claim 1, the at least one cluster controller further configured to:
   receive status information from the active packager and the another packager.

3. The system of claim 2, the at least one cluster controller further configured to:
   determine packager configuration based on the status and a network status.

4. The system of claim 1, the at least one cluster controller further configured to:
   switch from the active packager to the backup packager when a failure status is received from the active packager;
   configure the backup packager as the active packager by enabling the respective segment generator; and
   configure a failed active packager as offline by disabling the packet listener, the sequence list generator, and the segment generator.

5. The system of claim 4, the at least one cluster controller further configured to:
   configure the failed active packager as a tandem operating active packager by enabling the packet listener, the sequence list generator, and the segment generator;
   maintain operation of the active packager and the tandem operating active packager for a defined period;
   configure the active packager as a backup packager by disabling a segment generator upon expiration of the defined period; and
   configure the tandem operating active packager as the active packager.

6. The system of claim 1, the at least one cluster controller including a first cluster controller and a second cluster controller in a failover configuration, another streaming system component configured to designate an active cluster controller from the first cluster controller and a second cluster controller, the active cluster configured to configure the packagers.

7. The system of claim 1, the active packager configured to push the segments, the sequence list, and the metadata to the first cluster controller and the second cluster controller.

8. A packager device comprising:
   a primary packager;
   at least one secondary packager, each of the primary packager and the at least one secondary packager configured to process packets for streaming,
      wherein each of the primary packager and the at least one secondary packager includes a listener, a sequence provider, and a segmentor which is switchable between an on state and an off state by a controller that is separate from and in communication with the packagers, and
      wherein each of the primary packager and the at least one secondary packager is configured to push segments, a sequence list, and metadata to the controller; and
   the controller comprising a manifest generator that is located outside and remote from the primary packager and the at least one secondary packager, the controller configured to:
      receive segments, a sequence list, and metadata based on processed packets from the primary packager or the at least one secondary packager;

generate, via the manifest generator, a manifest based on the segments, the sequence list, and the metadata received from the active packager; and responsive to determining that the packet listener of the primary packager and the respective packet listener of the backup packager are not in synchronization, use the manifest generator of the controller to compare respective program transport stream (PTS) timestamps of a last available segment and a newly pushed segment, and insert a period to a newly pushed segment when there is a gap between the respective PTS timestamps.

9. The device of claim 8, the primary packager configured to:
listen for the packets;
provide a sequence list based on the packets;
generate segments from the packets; and
push the segments, the sequence list, and metadata to the controller.

10. The device of claim 8, the primary packager and the at least one secondary packager further configured to provide operational status to the controller.

11. A method for streaming, the method comprising:
configuring, by a controller that is separate from and in communication with packagers, a packager from the packagers as active with a packet listener, a sequence list generator, and a segment generator enabled;
receiving, from an active packager at the controller, a push message with a sequence list, segments, and associated metadata based on packets received by the packager as active;
generating, by a manifest generator at the controller, a manifest based on the sequence list, the segments, and the associated metadata, wherein the manifest generator is located outside and remote from the packagers;
sending, by the controller, the manifest and the segments; and configuring, by the controller, another packager from the packagers as standby with each packet listener and each sequence list generator enabled and with each segment generator disabled; and responsive to determining that the respective packet listener of the active packager and the respective packet listener of the another packager are not in synchronization:
using the manifest generator at the controller to compare respective program transport stream (PTS) timestamps of a last available segment and a newly pushed segment; and
starting, by the manifest generator, a period at the newly pushed segment when a gap is determined between the last available segment and the newly pushed segment.

12. The method of claim 11, the method further comprising:
receiving status information from the active packager and the another packager in standby; and
determining, by the controller, active and standby packager configuration based on the status and network status.

13. The method of claim 11, when the packager as active fails, the method further comprising:
re-configuring the packager as active to offline; and
re-configuring the another packager in standby to active.

14. The method of claim 13, the method further comprising:
re-configuring an offline packager back to active;
running the packager as active and the another packager as active for a defined number of segments; and
re-configuring the another packager to standby when the defined number of segments is exceeded.

* * * * *